United States Patent [19]
Johnson

[11] 3,979,852
[45] Sept. 14, 1976

[54] FISHING POLE MOUNTING DEVICE

[76] Inventor: Gilbert C. Johnson, 3538 Tompkins St., Gary, Ind. 46408

[22] Filed: Sept. 8, 1975

[21] Appl. No.: 611,172

[52] U.S. Cl. .................................................. 43/16
[51] Int. Cl.[2] ........................................ A01K 97/12
[58] Field of Search ................................. 43/16, 15

[56] References Cited
UNITED STATES PATENTS

| | | | |
|---|---|---|---|
| 2,661,563 | 12/1953 | Adams, Jr. et al. | 43/16 |
| 2,804,277 | 8/1957 | Kinder | 43/16 X |
| 2,996,824 | 8/1961 | Faycosh | 43/16 |
| 3,016,648 | 1/1962 | Ingersoll et al. | 43/15 |
| 3,591,970 | 7/1971 | Davenport | 43/15 |
| 3,762,090 | 10/1973 | Nelson et al. | 43/15 |

Primary Examiner—Louis G. Mancene
Assistant Examiner—Daniel J. Leach
Attorney, Agent, or Firm—Mann, Brown & McWilliams

[57] ABSTRACT

A fishing pole mounting device, for fishing poles equipped with a handle, a reel adjacent the handle and having a fishing line wound thereon and threaded through eyelets for attachment to fishing lures, which device comprises a post adapted to be mounted in an upright position and having a one piece frame secured thereto which defines a forwardly projecting portion at its projecting end shaped to define a laterally extending bridge arm over which the pole when in use extends, a fishing rod handle receiving assembly defining a socket for slip-fit receiving therein the handle of the fishing pole to mount the pole in its operative position on the assembly, with the assembly being mounted for swinging the fishing pole between a first position extending over the bridge arm and a second position in which the pole is disposed upright, means to bias the handle receiving assembly for movement to its second position, and a hold down and release mechanism for holding the pole at the assembly first position, with the hold down and release mechanism being actuated by a predetermined pull pressure on the fishing line to release the pole for movement to the assembly second position, and with the hold down and release mechanism having rough and fine adjustment for adjusting such mechanism to release the pole at the pull pressure deemed by the fisherman to best suit conditions.

9 Claims, 10 Drawing Figures

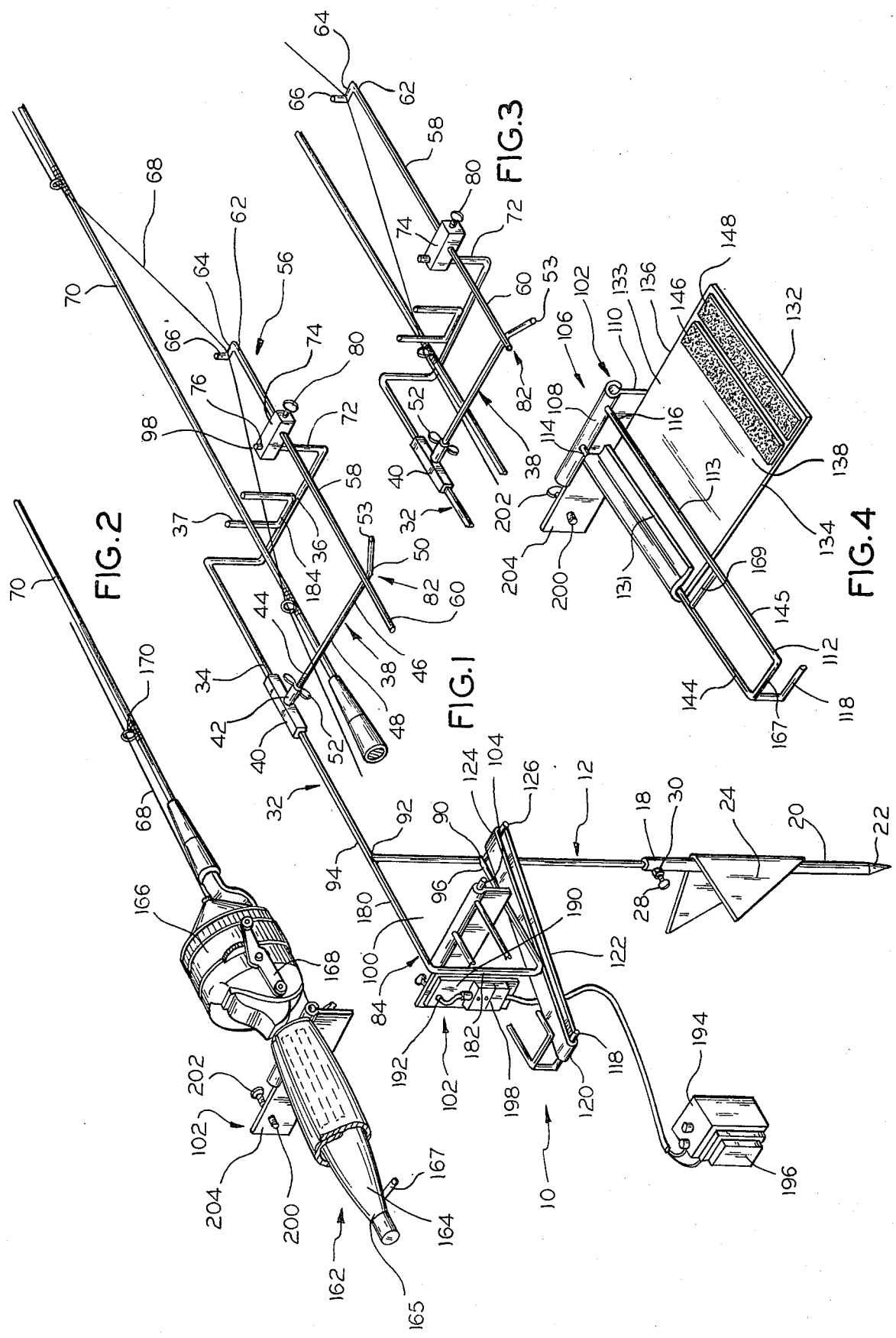

3,979,852

FISHING POLE MOUNTING DEVICE

This invention relates to a fishing pole mounting device, and more particularly, to a device for mounting fishing poles of the rod and reel type to set them up in fishing position without requiring that they be held by the fisherman.

A convenient manner of fishing from wharves and the banks of a stream or lake is to mount a rod and reel equipped fishing pole in a holder so that the fisherman need not be tied down to holding the rod, and so that several similarly mounted fishing poles may be operated by the fisherman at the same time.

The arrangement of the present invention is concerned with a fishing pole mounting device for rod and reel type poles which not only actuates the pole to set the hook when a fish strikes, and alerts the fisherman in such instance, but which also provides for rough and fine adjustments for accommodating desired variables in the pull pressure on the fishing line that will result in uprighting of the rod that will be dictated by the conditions under which the fishing is to be done.

A principal object of the invention is to provide a fishing pole mounting device for rod and reel fishing equipment which holds the rod in fishing position until a predetermined pull is applied to the fishing line, and then swings the rod to an upright position to oppose the pulling action of the fish on the line, while at the same time alerting the fisherman of the action involved.

Another principal object of the invention is to provide a fishing pole mounting device of the type indicated that provides for a rough and fine adjustment of the rod hold down and release mechanism to accommodate a wide range of line pull pressures that will actuate the device, whereby the device may be operated at best advantage in accordance with the fishing conditions involved.

Other objects of the invention are to provide a fishing pole mounting device of the type indicated that is adapted to accommodate a wide variety of fishing conditions and locations for both shore and boat fishing, and to provide a device of the type indicated that is economical of manufacture, convenient to set up and use, and long lived and sensitive in operation.

In accordance with the invention a fishing pole mounting device is provided for use in connection with a wide variety of makes and kinds of poles of the rod and reel type, which poles are typically equipped with a handle at the holding end of the pole, a reel adjacent the handle, and a fishing line wound on the reel and threaded through eyelets in spaced relation along the rod for attachment to fishing lures (natural or artificial). The device comprises a post adapted to be mounted in an upright position and carrying a one piece frame secured thereto which defines a forwardly projecting portion of rectilinear configuration that is normally horizontally disposed when the post is in upright position. The frame forwardly extending portion at its projecting end is shaped to define a laterally extending bridge arm over which the fishing pole is disposed in fish awaiting position.

The frame pivotally mounts rearwardly of the post, a fishing pole handle receiving assembly defining a socket for slip fit receiving therein the handle of the fishing pole, to mount the pole in its operative position on the assembly, with the assembly being mounted for swinging the fishing pole between a first fish awaiting position, in which the rod bears against the rest arm and awaits a strike, and a second fish opposing position in which the pole is disposed in an upright position for opposing a fish on the line. Acting between the assembly and the frame is means to bias the assembly for movement of same to dispose the fishing pole in its second position.

Operatively mounted on the forwardly projecting portion of the frame is a rod hold down and release mechanism for holding the pole at its first position, in which the hold down and release mechanism comprises a swing arm mounted on the frame rectilinear portion for pivotal movement with respect thereto and sliding movement therealong, that is to be swung over and against the rod in hold down relation thereto, and an elongate release member pivotally mounted intermediate its ends on the projecting end of the frame bridge arm for swinging movement about an upright axis disposed intermediate its ends to dispose same in hold down relation to the swing arm. The release member is disposed so that the fishing pole overlies the bridge arm between it and the frame rectilinear portion, and the swing arm defines a main rectilinear portion that is to engage the upper side of the rod, and that is to in turn be engaged by the rearwardly extending end of the release member. The forwardly extending end of the release member is shaped to define an upright abutment against which the fishing rod line is placed, when the release member engages the swing arm, to condition the hold down and release mechanism for release of the rod on a predetermined pull pressure being applied to the fishing line.

The amount of pull that will release the pole for movement to an upright position is adjustable, in accordance with the present invention, by making arcuate the projecting end portion of the hold down swing arm that cooperates with the hold down end of the release member, and providing for the swing arm to be adjustable about the axis of its main portion so as to be able to shift the projecting end thereof between upright and horizontal, or somewhat downwardly projecting, positions. Further, the release member, as well as the swing arm, are movable forwardly and rearwardly of the frame. This latter adjustability provides for variance of the leverage that the fishing line acts through to swing the release member free of the swing arm, while rotational movement of the swing arm about its axis varies the swinging force needed to be applied to the release member to swing it free of the hold down swing arm. The arrangement is such that a rough and fine adjustment is permitted to accommodate the setting of the hold down or release mechanism to release at predetermined pull on the fishing line.

Other objects, uses, and advantages will be obvious or become apparent from a consideration of the following detailed description and the application drawings.

In the drawings:

FIG. 1 is a diagrammatic perspective view illustrating one embodiment of the invention having a rod and reel type fishing pole applied thereto, in which parts are broken away to facilitate illustration, and also showing the hold down and release mechanism at one position of adjustment;

FIG. 2 is a diagrammatic fragmental perspective view showing the handle end of the fishing pole of FIG. 1 equipped with the pole handle receiving assembly applied to the pole handle in accordance with the invention;

FIG. 3 is a fragmental perspective view showing the hold down and release mechanism of FIG. 1 set in a different position of adjustment;

FIG. 4 is a diagrammatic perspective view illustrating the pole handle receiving assembly in further detail and showing the pocket forming member that forms the pocket for slip fit reception of the pole handle in the process of being applied to the frame that forms a part of the assembly in question;

However, it is to be distinctly understood that the specific drawing illustrations provided are supplied primarily to comply with the requirements of the Patent Laws, and that the invention is susceptible of other embodiments which will be obvious to those skilled in the art, and which are intended to be covered by the appended claims.

Figure 6:
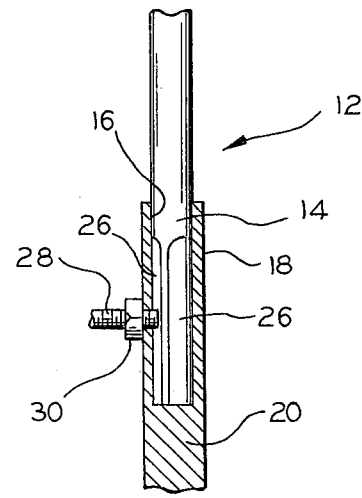
FIG. 6 is a fragmental sectional view showing the connection between the mounting device post and its supporting stake.

Reference numeral 10 of FIG. 1 generally indicates a preferred embodiment of the invention which comprises a post 12 having its lower end 14 received in a socket 16 (see FIG. 6) formed in the upper end 18 of stake 20 that is provided with a lower pointed end 22 for facilitating insertion of the stake into the ground. The stake 20 has right angled plate 24 fixed thereto, as by welding, to prevent rotation of the stake when it has been tapped into the ground.

The lower end 14 of post 12 is preferably formed with three flat surfaces 26 spaced at 120 degrees circumferentially thereabout that are adapted to be engaged by suitable thumb screw 28 that is threaded into stake 20 (which may have suitable nut 30 affixed thereto for this purpose). Alternately, post 12 may be of square section to provide four such surfaces 26 for engagement by screw 28.

The post 12 has affixed thereto a frame 32 defining an elongate rectilinear forwardly extending portion 34 that has its projecting end angled downwardly and laterally to define bridge portion 36 to which the U shaped rod locater member 37 is affixed (in the form of FIG. 1) as by welding.

Slidably mounted on the frame portion 34 is swing arm 38 which comprises a tubular member 40 slidably received on the frame rectilinear portion 34 and having affixed thereto an internally threaded stud 42 in which is threadedly received the threaded end 44 of rod member 46 that is shaped to define an elongate rectilinear main portion 48 and an angled end portion 50. The threaded end 44 of the rod member 46 has threadedly applied to same wing nut 52. End portion 50 is angled at an angle of approximately 67.5° relative to main portion 48, preferably at a bend located about two inches from the terminous 53 of arm 38.

The rod member 46 may be adjusted relative to stud 32 by backing off the wing nut 52 from the stud 42 and rotating the rod member 46 about the axis of its main portion 48, after which the wing nut 52 may be tightened against the stud 42 to hold the rod member 46 in a desired position of adjustment, as will be discussed in detail hereinafter.

Operably associated with the swing arm 38 is the release member 56, which comprises an elongate rod member 58 having its rearwardly extending end 60 adapted for engagement with swing arm 38 when the latter is in the positions of FIGS. 1 and 3, and a forwardly extending end 62 that is given the angled configuration indicated at 64 in the drawings to define an upright abutment 66 against which the line 68 of the fishing pole 70 may be placed.

Figure 7:
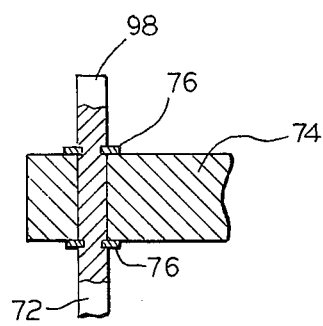
FIG. 7 is a fragmental sectional view showing details of the mounting arrangement for the device release member.

In accordance with the invention, the bridge arm 36 is extended laterally of the frame rectilinear portion 34 and upwardly angled to define pivot portion 72 on which mounting block 74 is journaled for pivotal movement about the upright axis that is defined by pivot portion 72. This may be done in any suitable manner, as by disposing the mounting block 74 between spaced snap rings 76 on either side thereof, as indicated in FIG. 7.

Rod member 58 is slidably received through mounting member 74 and may be set at a desired position of adjustment by applying thumb screw 80 thereto that is threadedly mounted in the mounting member 74. Member 74 is located on pivot portion 72 to dispose member 58 approximately at the level of frame portion 34.

The swing arm 38 and release member 56 form the rod hold down and release mechanism 82 that provide the close and sensitive line pull pressure adjustability contemplated by this invention.

The frame 32 rearwardly of the post 12 is shaped to define a tail portion 84 having the quadrilateral configuration indicated, with the frame 32 being fixed to the post as at 90 and 92 as by welding.

In the form shown, the frame 32 is a one piece rod member 94 bent to have the shape indicated in the drawings, with the result that one end 96 of the rod member 94 is affixed to the post 12, while the other end 98 of the rod member 94 forms the pivot portion 72. The frame portions 34 and 84 are in coplanar relation, as indicated in the drawings.

Figure 5:
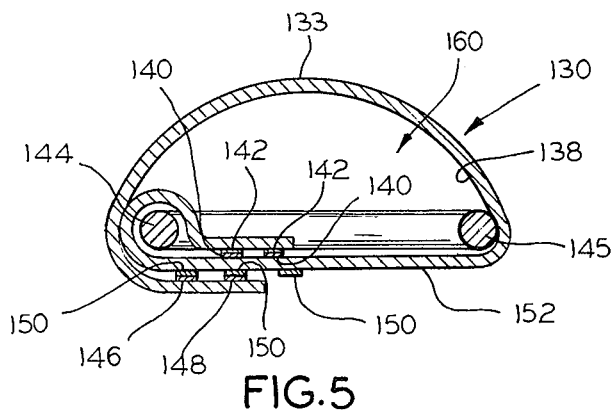
FIG. 5 is a transverse sectional view through the fishing pole handle receiving pocket forming member illustrating the manner in which it is assembled in pocket forming relation.

The rearwardly extended portion 84 of the frame 32 together with the post 12, define a quadrilateral working space 100 in which is pivotally mounted the fishing pole handle receiving assembly 102 that is illustrated in detail in FIGS. 4 and 5. For this purpose, the frame 32 has pivot rod 104 affixed thereto, at a corner of frame portion 84, to pivotally mount the assembly 102 where shown in FIG. 1.

The assembly 102 comprises a frame 106 formed by tubular member 108, an elongate plate member 110 that is affixed to the tubular member 108 and extends longitudinally thereof, and elongate subframe member 112 that extends normally of the tubular member 108 and is defined by bent rod 113 having its ends 114 and 116 coplanar and affixed to plate member 110, as by welding.

The frame 106 also includes angle element 118 affixed to the projecting end of subframe 112 that is to receive one end 120 of tension band 122 that is stretched to have its other end 124 applied over rod element 126 that is suitably affixed, as by welding, to the post 12, to spring bias the assembly 102 for purposes about to be made clear.

Operably associated with the frame 106 is the fishing pole handle receiving component 130, which in the form shown comprises a sheet 133 of naughayde material or the like, or quadrilateral configuration, defining rectilinear ends 131, 132 and rectilinear side edges 134 and 136. Applied to the side surface 138 of the sheet 133 are a pair of strips 140 and 142 (see FIG. 5) of self locking tape that are adapted to be brought into interlocking relation, so as to bind them together, when the end 131 of the sheet 133 is folded over the leg portion 144 of subframe 112, in the manner indicated in FIGS. 4 and 5, to initially secure the sheet 133 to the subframe 112. Suitable for use as strips 140 and 142 is the self gripping nylon product made by American Velcro Corporation and sold under the trademark Velcro (style No. 1075 is preferred); 140 and 142 are secured in place by stitching, and thus are piled such that their piles interlock when pressed together. Thus, the pile of one strip 140 may be closed loops and the pile of the other strip 142 may be hook like (or vice versa) in accordance with commercially available materials of this type.

Also applied to the surface 138 of sheet 133 are tape strips 146 and 148 that are adapted adhere to one or more strippings 150 applied to the other side 152 of the sheet 133, stripping 146, 148 being of the same mating type as strips 140 and 142. Assuming the sheet 133 has been applied to the subframe 112 in the manner indicated in FIG. 4, this permits the end 132 of the stripping 136 to be brought about the subframe for application of the strippings 146 and 148 to the mating strippings indicated at 150, in the manner indicated in FIG. 5, so as to define a pocket 160 that mounts the fishing pole 162 of which rod 70 forms a part. Stripping 146, 148 and 150 are secured in place by stitching or the like, with strippings 146 and 148 having the same interlocking relation relative to strippings 150 that stripping 140 has to stripping 142. Three strippings 150 are provided in the illustrated embodiment to permit variation in the size of the pocket to be formed by component 130. As is well known, tape of the type indicated for strippings 140, 142, 146, 148 and 150 provide firm interlock between the respective strippings when pressed together, which, however, can readily be separated by pulling interlocked strips apart.

The fishing pole 162 that is illustrated is intended to represent the various types of rod and reel equipment commonly available to serve as a fishing pole, which conventionally include the rod 70, the handle 164 for holding and operating same, a reel 166 on which the fishing line 68 is wound by operating the reel handle 168, and eyelets 170 suitably applied to the rod 70 through which the fishing line 68 is threaded through the end of the rod for connection to the fishing lure to be employed.

In accordance with the invention, the fishing pole 162 is applied to the assembly 102 by having the handle inserted in the pocket 160, which pocket 160 should be proportioned for a snug fit slip fit reception of the handle 164 therein.

As is well known, the size of fishing rod handles 164 varies for different makes and models and this can be accommodated by applying together the gripping tapes 146, 148 and 150 positioned so as to vary the size of the pocket 160 accordingly. Pocket 160 should be proportioned to snugly receive the handle 16 but permit ready removal and insertion of same, and the component 130 and subframe 112 should be proportioned in length such that the handle end 165 engages both the tubular member 108 and the bight 167 of subframe 112 for bracing purposes. In the form shown, subframe 112 includes cross rod 169 fixed between the legs 144 and 145, of rod 113 for bracing pole handles too short to reach the bight 167. Component 130 extends to rod 169.

Assembly 102 is mounted in operative position by applying the tubular member 108 to pivot rod 104 in the manner indicated in FIG. 1, and applying the tension band 122 between the assembly angle member 118 and the post rod 126.

As indicated in FIG. 2, the plate member 110 is proportioned to extend through the opening 100 defined by the frame 32 whereby the frame sections 180 and 182 serve as stops for limiting the range of movement of the assembly 102 relative to the frame 32. In the position of FIG. 1, the shaping of the parts involved is preferably such that when the plate member 110 engages the upright frame section 182, rod 70 engages the base 184 of locater 38. When the rod 70 is released so that the assembly 102 can pivot under the biasing action of tension band 122, plate 110 engages frame section 180 to limit the upward movement of the rod 70 to a vertical or near vertical position.

Further in accordance with the invention, the device 10 is arranged to emit a signal on release of the rod 70 (so as to permit the rod 70 to swing to vertical position). For this purpose, the frame 32 has affixed to same suitable mounting plate 190 to which is suitably applied a conventional normally closed switch 192 that is in suitable series circuit with suitable battery 194 and electrically operated buzzer 196, through the suitable adapter box 198 (these parts being diagrammatically illustrated) suitably fixed to plate 190. When the pole 162 is in the position of FIG. 1, the switch 102 is held normally open by the end 200 of suitable thumb screw 202 that is suitably threaded in the projecting end 204 of the stop plate 110.

The fishing pole 162 is applied to the subassembly 102 in the manner that has been described, which results in these parts being combined in the manner indicated in FIG. 2. The line 68 can be appropriately baited and thrown out either before or after the application of the subassembly 102. With the pole 162 applied to the subassembly 102, the tubular member 108 is then applied to the subassembly 102, the tubular member 108 is then applied to pivot pin 104, and the tension band 122 applied to subframe member 118 and the post rod 126 to apply the desired biasing action to the subassembly 102.

In this connection, it is preferred that the members 118 and 126 project in diverging relation, rather than parallel relation, to assist in maintaining the band 122 in operating position.

The pole 162 and subassembly 102 are now pivoted as a unit about pivot rod 104 to the position indicated in FIG. 1, with the rod 70 aligned with locater 38 (but not necessarily engaging same), after which the swing arm 38 and release member 56 are put in operative rod hold down relation in the manner suggested by FIGS. 1 and 3.

Should it be desired that a relatively light pull pressure on the fishing line be sufficient to release the pole 162 for swinging to vertical position, say a pull pressure of four pounds, then the swing arm 38 and release member 56 are moved forwardly to their positions suggested by FIG. 3, relative to the mounting block 74 and frame portion 34, respectively. Should it be desired that a higher pull pressure on the fishing line be required to effect the desired release, so as to accommodate river flow or tide action in the water, or the like, then the swing arm 38 and release member 56 are adjusted rearwardly of the mounting block 74 and frame portion 34, respectively, as indicated in FIG. 1.

This provides the rough adjustment of the hold down and release mechanism 82 that is contemplated by the invention.

The fine adjustment is provided by releasing the wing nut 52 from tubular stud 42 and turning swing arm 38 about the axis of its portion 48 as required to move the swing arm curved end between an upright position and a horizontal or downwardly inclined position. When the swing arm end is vertically disposed, the swing arm offers maximum resistance to swinging movement of release member 56 about its pivotal mounting 72, while when the swing arm is disposed so that its end portion 50 is downwardly inclined or at least horizontal, the swing arm offers minimum resistance to such swinging movement of release member 56. In setting mechanism 82 for a particular fishing set up, a conventional fish weigher of the hand held type may be attached to line 68 to give the pull pressure setting desired.

Assuming that the hold down and release mechanism 82 has previously been adjusted to provide release of the pole 162 at the pull pressure on the fishing line 68 that is desired, the setting up of the fishing pole 162 is completed, assuming that the baited end of the fishing line has been appropriately thrown out, by applying the fishing line 68 against the upright abutment 66 of release member 56, which incidentally should be disposed so that the abutment 66 is approximately upright when the release member 56 is clamped in its desired operating position.

When a fish is on the line and thus provides a pull pressure on the fishing line that exceeds the release pressure at which the hold down and release mechanism has been set, the pulling action on the fishing line 68 swungs the release arm 56 counterclockwise of FIGS. 1 and 3 to free the swing arm 38 for upward swinging movement under the bias applied to the subassembly 102 by the tension band 122, whereby the fishing rod is moved to its upright position, and the switch 192 closed to energize the buzzer 196 and alert the fisherman that a fish is on the line.

The frame 32 and post 12 may be conveniently formed from the rodding components illustrated, but, of course, other shaped raw materials may be utilized as may be found necessary or desirable.

The device 10 is particularly adapted for use on the bank of a lake or stream, in conjunction with the stake 20, whereby the stake 20 can be first driven into the soil for application thereto of the post 12. In such instances, the stake is driven into the ground sufficiently to sink the angled plate 24 therein whereby rotational movement of the stake 20 is prevented. The frame 32 and post 12 can be angled relative to the bank as desired by setting the set screw 28 against the appropriate face 26 of post 12.

For use in boats, the stake 20 can be conveniently clamped against the side of a boat, by utilizing a conventional C clamp, against the side of the angle plate 24 that will fix the stake 20 flush against the side of the boat, with the post 12 then being appropriately applied to the stake 20.

Figure 8:
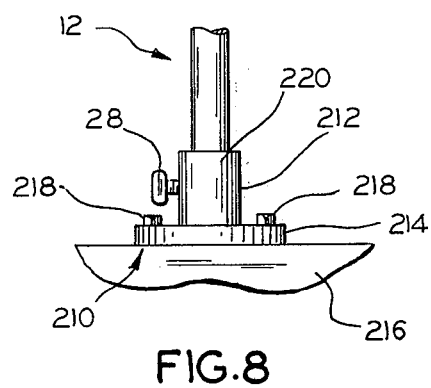
FIGS. 8–10 are fragmental views illustrating variant forms of the invention.

For use on wharves or docks that do not accommodate the application thereto of stake 20, a mounting 210 of the type shown in FIG. 8 may be employed to accommodate the post 12. Mounting 210 comprises bracket 212 having a flange 214 secured to the wharf 216 by screws or bolts 218, and having a hub portion 220 formed in the manner indicated in FIG. 6 to receive post 12 and secure same in place using screw 28.

Figure 9:
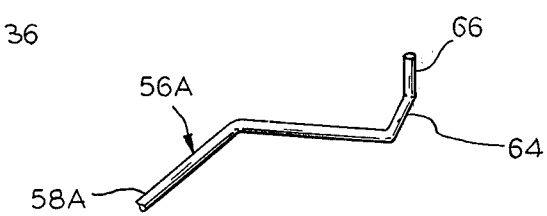

If desired, the release member 56 may have its end 64 angled relative to its end 60, as indicated in FIG. 9, wherein member 56A comprises rod 58A hving its end 64 angled so as to be directed away from rod 70 when release member 56A engages swing arm 38; a 45 degree angle bend in member 56A located about three inches from configuration 64, and in a plane extending normally of rod member end 98, is preferred. This form is useful where bridge arm 36 is dimensioned so that on release of rod 70 end 64 might otherwise interfere with the rising action of rod 70.

Figure 10:
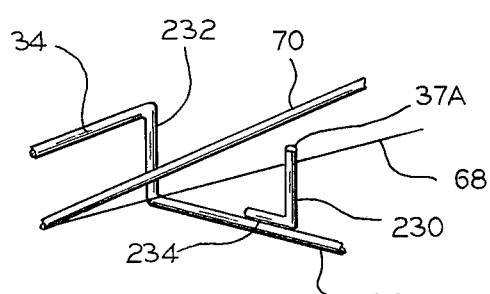

In the form of FIG. 10, the locator 37A is of "J" configuration having its longer leg 230 cooperating with the vertical portion 232 of frame 32 to provide the pole locating function of locator 37; the short leg 234 of locator 37A is fixed to the frame bridge portion as by welding. This arrangement simplifies the pole locator.

It will therefore be seen that the present invention provides a simplified and effective fishing pole mounting device, of the type in which the fishing pole is swung to a vertical position, to better position the rod for opposing the fishing action on the line, when a fish is on the line. The specific hold down and release mechanism provided is arranged to provide a rough and fine adjustment for sensitively setting the fishing line pull pressure that is to release the device.

The fishing pole mounting assembly of the device requires no modification of the fishing pole to mount same in its operative position, and an easily handled slip fit action is all that is required to apply the fishing pole to the assembly that pivotally mounts same on the mounting device 10. The pole handle receiving pocket is also readily adjusted to accommodate different poles of variant sizes.

The adjustability provided by the hold down and release mechanism of the invention permits the device to accommodate a wide variety of fishing conditions, such as variations in water flow due to tide or current, or the like, boat motion, or wave motion, and the size and type of fish to be sought.

The biasing action provided by the tension band 122 can be provided by a band or bands or resilient elastomeric material such as rubber, or coil springs, or other forms of tension springs and other equivalent devices or mechanisms.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A fishing rod mounting device for mounting a fishing rod equipped with handle for the rod, a reel adjacent the handle, and a line wound the reel and threaded through eyelets along the rod for connection to fishing lures, said device comprising:
a post including means for mounting same in an upright position,
a holder frame fixed to said post and including a rectilinear slide portion extending crosswise of the post, said frame slide portion projecting forwardly of the post and having adjacent its projecting end portion a laterally extending bridge arm, said frame pivotally mounting a fishing rod handle receiving assembly defining a socket for receiving the handle of the fishing rod to mount the rod in its operative position in said assembly, said assembly being mounted for pivotal movement between a first position in which the fishing rod overlies said bridge arm and a second position in which said rod is disposed in upright relation, means for biasing said assembly to swing from said first to said second position, said frame slide portion mounting a swing arm thereon for pivotal movement with respect thereto, said swing arm defining a projecting end portion and being proportioned to rest on the fishing rod when the fishing rod is in its said operative position and overlies said rest arm, and an elongate release member pivotally mounted on said bridge arm for swinging movement about an upright axis disposed intermediate its ends, said release member hving its rearward end proportioned for engaging the upper side of said swing arm when the latter engages the rod and having its forward end shaped to define an upright abutment against which the fishing rod line may be placed when the fishing rod is disposed over said bridge arm, whereby when the fishing rod is in its said operative position and is disposed over said bridge arm with said swing arm resting on the rod and engaged by said rearward end of said release member, with the rod fishing line engaging said abutment, a predetermined pull on the line will swing said release member off said swing arm whereby said biasing means is operative to swing said assembly and the fishing rod carried thereby to said second position of same.

2. The device set forth in claim 1 wherein:
said release member is adjustable longitudinally thereof, with respect to said upright axis thereof, for variance of said pull on the line.

3. The device set forth in claim 2 wherein:
said swing arm is adjustable longitudinally of said frame slide portion.

4. The device set forth in claim 1 wherein:
said swing arm comprises a rectilinear main portion that engages the rod,
with said end portion thereof being angled sideways thereof,
said swing arm being adjustable about the axis of said main portion thereof to dispose said end portion thereof at selected angled relations to said release member rearward for variance of said pull on the line.

5. The device set forth in claim 1 wherein:
said forward end of said release member is angled to extend away from the rod when the rod is in said first position thereof.

6. The device set forth in claim 1 wherein:
said release member is straight between said forward and rearward ends thereof.

7. The device set forth in claim 1 wherein said assembly comprises:
a frame having sheeting looped thereabout to define said socket,
and an indexing member fixed to said assembly frame in substantial parallelism to the pivot axis of said assembly,
said holder frame including stop means for limiting said pivotal movement of said assembly to movement between said positions thereof under the action of said biasing means.

8. The device set forth in claim 6 including:
signal emitting means for indicating when said assembly is in its said second position,
and means actuated by said assembly on moving to said second position from said first position for activating said signal means.

9. The device set forth in claim 1 including:
a stake receiving said post in an upright position,
and means for securing said post to the stake for adjustment about the axis of said stake.

* * * * *

UNITED STATES PATENT OFFICE
CERTIFICATE OF CORRECTION

Patent No. 3,979,852                    Dated September 14, 1976

Inventor(s)    GILBERT C. JOHNSON

It is certified that error appears in the above-identified patent and that said Letters Patent are hereby corrected as shown below:

Column 5, line 63, "16" should be --164--; Column 6, line 61, between "line" and "be" insert --68--; Column 8, line 7, "hving" should be --having--; Column 10, line 39, Claim 9 between "post" and "in" insert -- for mounting said post--.

Signed and Sealed this

Twenty-fifth Day of January 1977

[SEAL]

Attest:

RUTH C. MASON  
Attesting Officer

C. MARSHALL DANN  
Commissioner of Patents and Trademarks